US009097003B1

(12) United States Patent
Sultan et al.

(10) Patent No.: US 9,097,003 B1
(45) Date of Patent: Aug. 4, 2015

(54) SADDLE BRACKET ASSEMBLIES

(71) Applicant: The Boeing Company, Seal Beach, CA (US)

(72) Inventors: Saif Sultan, Bothell, WA (US); Bogdan M. Popescu, Snohomish, WA (US); Ramanlal A. Patel, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/281,125

(22) Filed: May 19, 2014

(51) Int. Cl.
*E04B 1/38* (2006.01)
*E04B 1/41* (2006.01)
*E04B 1/61* (2006.01)
*F16B 5/00* (2006.01)
*B64C 1/06* (2006.01)

(52) U.S. Cl.
CPC . *E04B 1/40* (2013.01); *B64C 1/069* (2013.01); *E04B 1/61* (2013.01); *F16B 5/0004* (2013.01); *E04B 2001/405* (2013.01)

(58) Field of Classification Search
CPC ... E04B 1/40; E04B 2001/405; F16B 5/0024; F16B 5/0004
USPC ............... 52/787.12, 787.1, 285.1, 702, 713, 52/127.2, 127.8, 202, 288.1, 241, 242, 52/243; 49/462; 248/229.15, 219.4
See application file for complete search history.

(56) References Cited

U.S. PATENT DOCUMENTS

| 1,777,884 | A | * | 10/1930 | Horix | 248/230.5 |
|---|---|---|---|---|---|
| 1,784,797 | A | * | 12/1930 | Weinheim | 156/314 |
| 3,318,061 | A | * | 5/1967 | Stentz | 52/288.1 |
| 3,358,411 | A | * | 12/1967 | Birum, Jr. | 52/241 |
| 3,477,186 | A | * | 11/1969 | Birum, Jr. | 52/242 |
| 3,733,755 | A | * | 5/1973 | Butler | 52/36.6 |
| 3,828,394 | A | * | 8/1974 | Horgan, Jr. | 16/241 |
| 4,118,827 | A | * | 10/1978 | Yamamoto | 16/252 |
| 4,403,452 | A | * | 9/1983 | Urbanick | 49/501 |
| 4,708,007 | A | * | 11/1987 | Stoia | 70/451 |
| 4,825,509 | A | * | 5/1989 | Mitchell et al. | 16/382 |
| 4,887,856 | A | * | 12/1989 | Percoco et al. | 292/337 |
| 4,987,708 | A | * | 1/1991 | Wilcox | 52/126.6 |
| 5,031,946 | A | * | 7/1991 | Yarrow | 292/337 |
| 5,039,048 | A | * | 8/1991 | Paxton | 248/229.24 |
| D375,893 | S | * | 11/1996 | Hutcheson et al. | D8/394 |
| 5,927,649 | A | * | 7/1999 | Nykiforuk | 244/118.1 |
| 6,302,469 | B1 | * | 10/2001 | Jones | 296/100.16 |
| 6,418,590 | B1 | * | 7/2002 | Nipper et al. | 16/382 |
| 6,494,639 | B1 | * | 12/2002 | Friend | 403/403 |
| 6,899,053 | B2 | * | 5/2005 | Hawkins | 116/173 |

(Continued)

*Primary Examiner* — Brent W Herring
(74) *Attorney, Agent, or Firm* — DASCENZO Intellectual Property Law, P.C.

(57) ABSTRACT

Saddle bracket assemblies and corresponding methods of assembly and/or use are disclosed. Saddle brackets comprise two bracket members, a male bracket member and a female bracket member. The bracket members are configured to mate to a panel, such as a sandwich panel, through one or more panel passages through the panel. The bracket members generally have an L-shaped profile with two arms. The male bracket member includes one or more standoffs affixed to one arm, the standoff(s) being configured to fit the panel passage (s). The saddle bracket is assembled by inserting the standoff (s) through the panel passage(s), aligning the female bracket member to the standoff(s) and/or the panel passage(s), and securing the bracket members together with one or more panel connectors coupling the standoff(s) of the male bracket member, though the panel passage(s), to the female bracket member.

12 Claims, 5 Drawing Sheets

(56) References Cited

U.S. PATENT DOCUMENTS

| | | | |
|---|---|---|---|
| 8,215,072 B2 * | 7/2012 | Gorman | 52/202 |
| 8,215,073 B2 * | 7/2012 | Gorman et al. | 52/202 |
| 2003/0006342 A1 * | 1/2003 | Page, Jr. | 244/118.5 |
| 2007/0262219 A1 * | 11/2007 | Hutter | 248/229.1 |

* cited by examiner

SADDLE BRACKET ASSEMBLIES

FIELD

The present disclosure relates to saddle bracket assemblies and methods of use thereof.

BACKGROUND

Sandwich panels, which can be engineered for high stiffness and low density, are used in many applications such as for interiors, exteriors, and/or supports in vehicles and buildings. Sandwich panels have two skins and a core. The skins typically are rigid and form the panel's sides (the largest area sides, also called the facings of the panel). The core is typically a lightweight structure that spans between the skins, for example a honeycomb structure, a corrugated structure, a foam, or other filler material.

The composition and arrangement of the skins and core provide potentially enhanced strength and stiffness relative to solid panels. However, the individual components may be substantially weaker than the sandwich panel as a whole. Hence, to couple sandwich panels to other structures, generally, one rigidly couples to both skins of the sandwich panel. For this purpose, sandwich panels may include internal frames, blocks, inserts, etc. that span between, and are bonded to, the skins in certain regions. Sometimes, sandwich panels are fabricated without any significant internal structure except the core. In this case, passages may be formed in the panel to receive inserts and/or filler material. The internal structures (e.g., frames, blocks, inserts and/or filler material) are designed to provide the support needed to attach fasteners to the sandwich panel and to transfer forces through the fastener to the panel.

One type of bracket that connects to sandwich panels is a saddle bracket, a bracket with a U-shaped profile that is configured to wrap around an end region of the sandwich panel, covering both skins and an edge surface. Saddle brackets typically have aligned holes in the spaced-apart arms of the bracket, with the holes aligned to allow a fastener to pass through the aligned holes and a passage in the sandwich panel, thus securing the bracket to both skins of the sandwich panel.

However, use of such saddle brackets is cumbersome, requiring some sort of internal structure in the sandwich panel to support the fasteners. This may involve drilling passages in the panel and bonding inserts into the passages. It may involve fabricating or selecting sandwich panels with appropriately placed frames and/or internal blocks. Additionally, it may involve attaching fasteners to the bracket on both facings and/or securing fasteners from both sides (facings) of the panel (e.g., where the fastener is a bolt-nut combination).

Therefore, there is a need for improved saddle brackets and methods of assembling brackets to panels that simplifies preparation of the panel and assembly of the brackets and/or bracket-panel assemblies.

SUMMARY

Saddle bracket assemblies and corresponding methods of assembly and/or use are disclosed. Saddle brackets comprise two bracket members, a male bracket member and a female bracket member. The bracket members are configured to mate to a panel, such as a sandwich panel, through one or more panel passages through the panel. The bracket members generally have an L-shaped profile with two arms. The male bracket member includes one or more standoffs affixed to one arm, the standoff(s) being configured to fit the panel passage(s). The saddle bracket is assembled by inserting the standoff(s) through the panel passage(s), aligning the female bracket member to the standoff(s) and/or the panel passage(s), and securing the bracket members together with one or more panel connectors coupling the standoff(s) of the male bracket member, through the panel passage(s), to the female bracket member.

Male bracket members include a body and one or more standoffs. The body of the male bracket member includes a principal arm and an auxiliary arm. The standoffs are affixed to the principal arm of the male bracket member. Female bracket members include a body with a principal arm and an auxiliary arm. The principal arm of the female bracket member defines one or more panel-coupling holes configured to align with the standoffs of the mating male bracket member.

Each of the male bracket member and the female bracket member may include one or more bracket-coupling holes defined in the auxiliary arms of the bracket members. When the panel-coupling hole(s) of the female bracket member are aligned with the standoff(s) of the male bracket member, the bracket-coupling holes generally are aligned also.

DESCRIPTION

Figure 1:
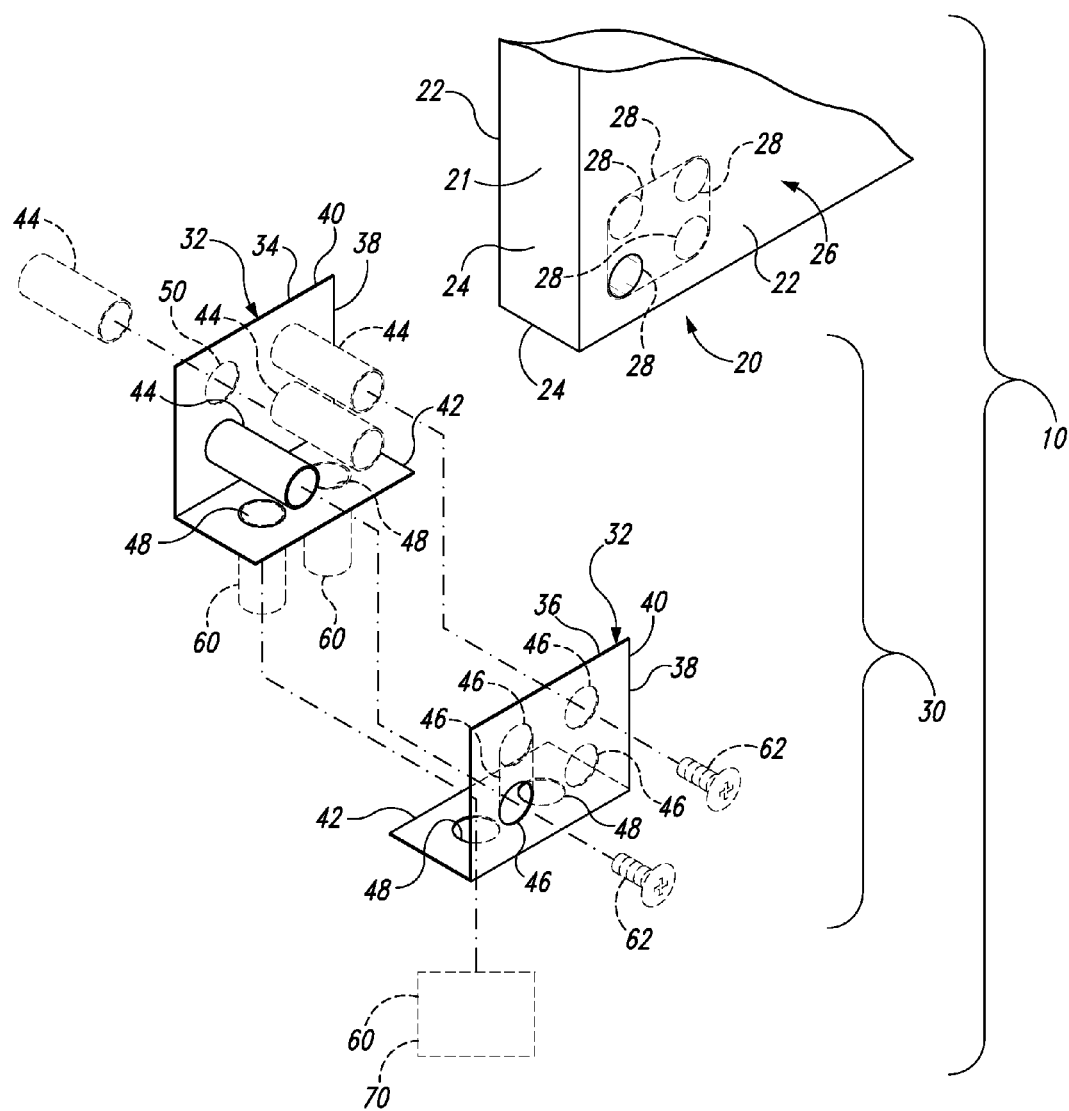
FIG. 1 is a schematic representation of saddle bracket assemblies.
Figure 2:
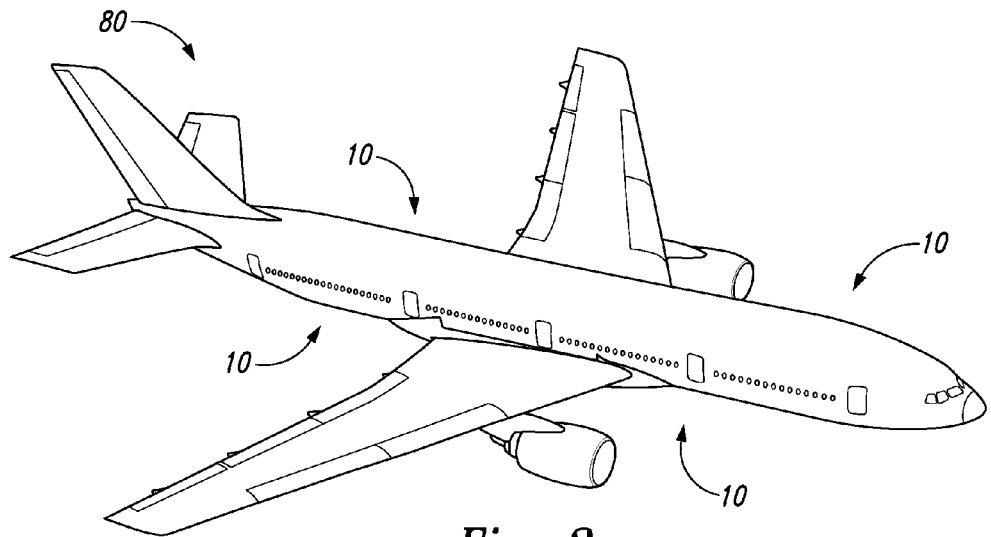
FIG. 2 is a drawing of an illustrative, non-exclusive example of a structure (which is an aircraft) that incorporates saddle bracket assemblies of the present disclosure.

FIGS. 1-9 illustrate saddle bracket assemblies, associated components, and methods of use thereof. Elements that serve a similar, or at least substantially similar, purpose are labeled with numbers consistent among the figures. Like numbers in each of the figures, and the corresponding elements, may not be discussed in detail herein with reference to each of the figures. Similarly, all elements may not be labeled in each of the figures, but reference numerals associated therewith may be used for consistency. Elements, components, and/or features that are discussed with reference to one or more of the figures may be included in and/or used with any of the figures without departing from the scope of the present disclosure. In general, elements that are likely to be included are illustrated in solid lines, while elements that may be optional or alternatives are illustrated in dashed lines and/or with dashed lead lines. However, elements that are shown in solid lines are not necessarily essential, and an element shown in solid lines may be omitted without departing from the scope of the present disclosure.

FIG. 1 illustrates assemblies 10 of panels 20 and saddle brackets 30 (i.e., bracket-panel assemblies). Panels 20 have two substantially parallel facings 22. The facings 22 generally are the largest area surfaces of a panel 20 and are separated from each other by the thickness of the panel 20, e.g., a core 21 of the panel 20. The edge of a panel 20 includes at least one edge surface 24 that spans between the facings 22.

Though saddle brackets 30 may be useful with sandwich panels, panel 20 may be any sort of panel that can support one or more panel passages 28. For example, panel 20 may be a solid panel, a laminate panel, a composite panel, and/or a sandwich panel. Suitable sandwich panels include a honeycomb-core panel, a foam-core panel, a hollow-core panel, and/or a corrugated-core panel. Cores 21, when present, may define at least one hollow space, such as found in a honeycomb core, a foam core, a hollow core, and a corrugated core. Panels 20 may be at least a portion of a wall, a partition, a divider, a bulkhead, a door, a shelf, a closet, a compartment, a bin, a ceiling, and/or a floor. Panels 20 may be a portion of and/or incorporated into a building or a vehicle, such as an aircraft 80 (as viewed in FIG. 2), a watercraft, and/or a land vehicle.

As schematically represented in FIG. 1, panels 20 define one or more panel passages 28 in an edge region 26 (a region of the panel that is near and includes at least a portion of one of the edge surfaces 24). Panel passages 28 span the thickness of the panel 20, from one facing 22 to the other facing 22. Panel passages 28 may be formed directly in the panel 20 or may be formed in a component coupled to the panel 20. For example, a panel passage 28 may be formed by boring a hole through the panel 20, optionally followed by filling the hole with an insert that defines a passage and by forming a hole in the insert, if need be. Illustrative, non-exclusive examples of inserts that may be bonded to the panel to form a panel passage 28 and/or a support for a panel passage 28 include a ferrule, a bushing, and epoxy. Unlike in a panel configured for a conventional bracket and/or a conventional saddle bracket, panels 20 do not need internal support for fasteners coupled to the panel passages 28. Panels 20 only need enough internal support to define a panel passage 28 through the panel 20.

Assemblies 10 comprise saddle brackets 30 that are configured to attach to a panel 20 by surrounding (e.g., partially covering or overlying) the edge region 26 of the panel 20 on at least three sides, i.e., at least one of the edge surfaces 24 and both of the facings 22 of the panel 20. Saddle brackets 30 also may be described as wrap-around brackets. Saddle brackets 30 may be configured to connect other structures to the panel 20 and/or to connect the panel 20 to other structures. Other structures may include, or may be at least a portion of, another panel, a building and/or a vehicle.

Saddle brackets 30 are composed of at least two bracket members 32, namely a male bracket member 34 and a female bracket member 36. Each bracket member may be essentially a half of the whole, assembled saddle bracket 30. Each of the two bracket members 32 may be substantially similar and configured to mate with the other bracket member 32 and the panel 20. Bracket members 32 include a body 38 with two arms arranged approximately perpendicular to each other. Hence, the body 38 of a bracket member 32 has a profile that is substantially L-shaped. However, the two arms do not necessarily need to be approximately perpendicular to each other and the arms may form an acute, obtuse, or a right angle therebetween. The body 38 of a bracket member 32 may be essentially a unitary piece formed with an angle between the two arms. For example, the body 38 may be formed from a folded piece of sheet metal, or from a folded, molded, or otherwise formed plastic material.

The two arms of the body 38 are the principal arm 40 and the auxiliary arm 42. Principal arms 40 are configured to lie against one of the facings 22 of the panel 30. Auxiliary arms 42 are configured to span at least a portion of the thickness of the panel 20 (a portion of the edge surface 24). The auxiliary arms 42 of the two bracket members 32 of a saddle bracket 30 generally are configured to mate, couple, and/or align such that the combination of auxiliary arms 42 may span the thickness of the panel 20. Auxiliary arms 42 also may be configured to support a bracket connector 60 (configured to secure two bracket members 32 together to form a saddle bracket 30) and/or a structural connector 70 (configured to secure the saddle bracket 30 to other structures).

When assembled together to form the saddle bracket 30, the body 38 of the male bracket member 34 and the body 38 of the female bracket member 36 form a U-shaped profile. The principal arms 40 of the bracket members 32 form the spaced-apart arms of the U-shaped profile. The auxiliary arms 42 of the bracket members 32 form the bridge section of the U-shaped profile. The auxiliary arms 42 of the two bracket members 32 may overlap, abut, and/or interleave to form the bridge section of the U-shaped profile.

Male bracket members 34 include one or more standoffs 44 affixed to the principal arm 40 of the male bracket member 34. The standoffs 44 are configured to mate with one or more panel passages 28. The standoffs 44 may be affixed, for example, by crimping, press fitting, snap fitting, fastening, bonding, brazing, welding, etc. Additionally or alternatively, standoffs 44 may be integral to the principal arm 40 (e.g., formed by molding, machining, casting, and/or additive manufacturing). The principal arm 40 of the male bracket member 34 may define one or more standoff holes 50 into which standoffs 50 may be inserted and affixed.

Standoffs 44 of a male bracket member 34 generally project from the principal arm 40 and project generally perpendicularly from the principal arm 40 and/or generally parallel to the auxiliary arm 42. Standoffs 44 generally project from the same side of the principal arm 40 as the auxiliary arm 42. Hence, when assembled together with the female bracket member 36 to form the saddle bracket 30, the standoffs 44 generally span at least a portion of the gap between the spaced-apart arms of the U-shaped profile. Standoffs 44 may be configured to substantially span the thickness of the mating panel 20, being longer, shorter and/or substantially the same as the thickness of the panel 20. In FIG. 1, one standoff 44 is shown in solid lines. Three optional standoffs 44 are shown in dashed lines. However, male bracket members 34 may include any number of standoffs 44, including, but not limited to, 1, 2, 3, 4, 5, 6, 8, and/or a plurality of standoffs 44.

Standoffs 44 are configured to fit within panel passages 28 and panel passages 28 are configured to accept standoffs 44. Panel passages 28 generally define an opening sufficiently large to fit one or more standoffs 44. Standoffs 44 and panel passages 28 may have any of a variety of profiles. For example, in FIG. 1, standoffs 44 are shown with a generally cylindrical form and a circular profile. Standoffs 44 may have a columnar form and may have a polygonal profile. In FIG. 1, four panel passages 28 are shown with a generally circular profile. Panel passages 28 may have a profile which may or may not be configured to match the profile of the mating standoff 44. Panel passages 28 may have a circular profile, a polygonal profile, an oval profile, a slot profile, etc.

Standoffs 44 and panel passages 28 may have a one-to-one relationship, with each standoff configured to fit within a different panel passage 28, and/or a many-to-one relationship, with one panel passage 28 configured to simultaneously accept more than one standoff 44, as schematically illustrated in FIG. 1 with a dashed line encompassing the four circular profile panel passages 28. In FIG. 1, one panel passage 28 is shown in solid line. Four optional configurations of panel passages 28 are shown in dashed lines. However, panels 20 may include any number of panel passages 28, including, but not limited to, 1, 2, 3, 4, 5, 6, 8, and/or a plurality of panel passages 28.

Standoffs 44 are configured to mate with (e.g., to accept and/or to receive) a panel connector 62 (e.g., a fastener) at the free end (the end away from the principal arm 40). That is, standoffs 44 may include features, such as threads (e.g., internal threads and/or external threads) that mate with corresponding features, such as threads, of panel connectors 62. In addition or as an alternative to threads, standoffs 44 may be configured to mate with other fastener features, for example, mating with pins, snaps, studs, wires, nails, barbs, etc. Standoffs 44 may be hollow, defining a passage through the standoff 44 and/or may be configured to accept and/or to receive a fastener, such as a panel connector 62, at both ends of the standoff 44 (i.e., the end affixed to the principal arm 40 and the free end). Panel connectors 62 may be fasteners that include, or are, a screw, a nut, a pin, a press pin, a push pin, a stud, a socket, a snap, a wire, a bolt, a clip, etc.

Where the standoff(s) 44 project from the principal arm 40, the male bracket member 34 may be assembled to the panel 20 by aligning the standoff(s) 44 to the panel passage(s) 28 and then inserting the standoff(s) 44 into the panel passage(s) 28 (or equivalently sliding the panel 20 over the standoff(s) 44).

Auxiliary arms 42 of male bracket members 34 are configured to connect to the auxiliary arm 42 of a female bracket member 36. Auxiliary arms 42 of the male bracket members 34 may define at least one bracket-coupling hole 48 that is configured to accept a bracket connector 60 and/or or a structural connector 70. Additionally or alternatively, male bracket members 34 may include a bracket connector 60 affixed to the auxiliary arm 42. The bracket connector 60 may be affixed, for example, by crimping, press fitting, snap fitting, fastening, bonding, brazing, welding, etc., and may be affixed in a bracket-coupling hole 48. Additionally or alternatively, bracket connectors 60 may be integral to the auxiliary arm 42 (e.g., formed by molding, machining, casting, and/or additive manufacturing). When coupled, affixed, and/or formed, the bracket connector 60 generally projects from the auxiliary arm 42, substantially perpendicular to the auxiliary arm 42 and/or substantially parallel to the principal arm 40, and generally projects from the opposite side of the auxiliary arm 42 as does the principal arm 40.

Female bracket members 36 define one or more panel-coupling holes 46 corresponding to the one or more panel passages 28 of the panel 20 and the one or more standoffs 44 of the male bracket member 34. The panel-coupling hole(s) 46 are configured and arranged to align with the standoff(s) 44 of the male bracket member 34. The panel-coupling holes 46 may be arranged in a one-to-one relationship with the standoff(s) 44, i.e., the size, number and, arrangement of the panel-coupling holes 46 generally mirrors the size, number, and arrangement of standoffs 44. The panel-coupling hole(s) 46 may be arranged in a one-to-many relationship with the standoffs 44, i.e., at least one panel-coupling hole 46 is configured to simultaneously fit more than one standoff 44. For example, a panel-coupling hole 46 may be a slot sized to span the distance between two standoffs 44 of the male bracket member 34, as schematically illustrated in FIG. 1. Additionally or alternatively, the panel-coupling holes 46 may be configured to align with the standoff(s) 44 in different positions. For example, one standoff 44 may align with one panel-coupling hole 46 in one relative position of the male bracket member 34 and the female bracket member 36 and the standoff 44 may align with another panel-coupling hole 46 in a different relative position.

In FIG. 1, one panel-coupling hole 46 is shown in solid lines. Four optional panel-coupling holes 46 are shown in dashed lines. However, female bracket members 36 may include any number of panel-coupling holes 46, including, but not limited to, 1, 2, 3, 4, 5, 6, 8, and/or a plurality of panel-coupling holes 46.

Panel-coupling holes 46 are configured to allow the panel connectors 62 to access the standoffs 44 when the panel-coupling holes 46 are aligned over the free end(s) of the standoff(s) 44. When a panel connector 62 is installed in a standoff 44 through a panel-coupling hole 46, the panel connector 62 couples the standoff 44 of the male bracket member 34 and the principal arm 40 of the female bracket member 36, and, thus, couples the male bracket member 34 and the female bracket member 36 together.

Auxiliary arms 42 of female bracket members 36 define a bracket-coupling hole 48 that is configured to align with one or more bracket-coupling holes 48 of the male bracket member 34 and/or configured to accept one or more bracket connectors 60 affixed, or otherwise coupled, to the auxiliary arm 42 of the male bracket member 34.

The auxiliary arms 42 of the male bracket member 34 and the female bracket member 36 may each independently include at least two bracket-coupling holes 48. The two bracket members 32 may be configured such that the bracket-coupling holes 48 of mating bracket members 32 align (when the panel-coupling holes 46 are aligned with the standoff(s) 44) in a one-to-one, a many-to-one, a one-to-many, or a many-to-many relationship. For example, each bracket-coupling hole 48 of the male bracket member 34 may align with a different bracket-coupling hole 48 of the female bracket member 36. As another example, two bracket-coupling holes 48 of the male bracket member 34 may align with one bracket-coupling hole 48 of the female bracket member 36.

A bracket connector 60 may be applied and/or attached to and/or through the bracket-coupling holes 48 of the two bracket members 32 of the saddle bracket 30 to secure the two bracket members 32 together. The bracket-coupling holes 48 of the mated bracket members 32 may be arranged to allow a bracket connector 60 to be applied and/or attached through one of several alternate positions. Where the male bracket member 34 includes and/or is coupled to a projecting bracket connector 60, the female bracket member 36 may be assembled to the male bracket member 34 by aligning the bracket-coupling hole 48 of the female bracket member 36 to the projecting bracket connector 60 of the male bracket member 34 and then sliding the bracket-coupling hole 48 over the bracket connector 60 (or equivalently inserting the bracket connector 60 through the bracket-coupling hole 48). Bracket connectors 60 may be fasteners that include, or are, a screw, a nut, a pin, a press pin, a push pin, a stud, a socket, a snap, a wire, a bolt, a clip, etc.

Saddle brackets 30 may be connected to other structures with a structural connector 70. Generally, structural connectors 70 are coupled to the bridge section of the U-shaped profile of the saddle bracket 30. Structural connectors 70 may include a portion that couples directly to a bracket connector 60 and a portion that couples to other structure(s). Structural connectors 70 may include a screw, a nut, a pin, a bolt, a threaded rod, an internally threaded barrel, a clip, a hook, a clamp, a snap, a stud, a wire, a clevis, etc.

Figure 3:
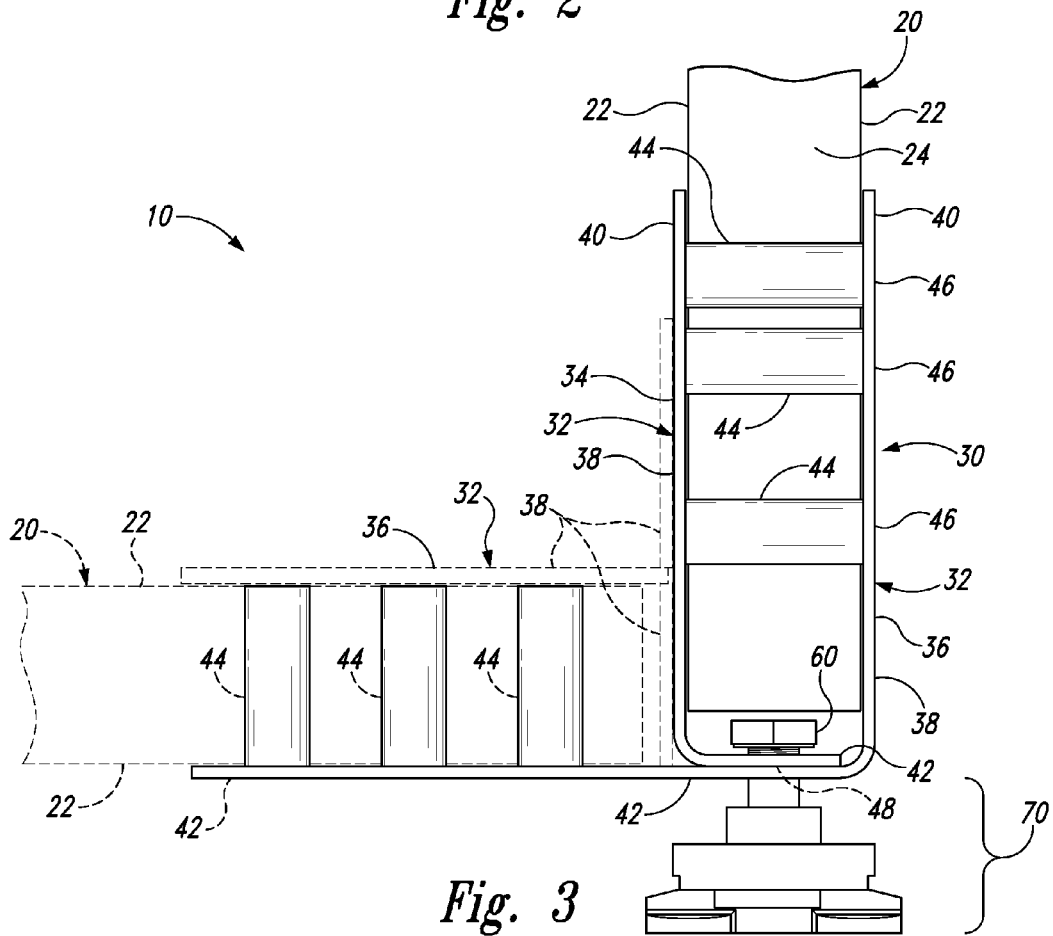
FIG. 3 is a drawing of an illustrative, non-exclusive example of saddle bracket assemblies configured to secure two panels.
Figure 4:
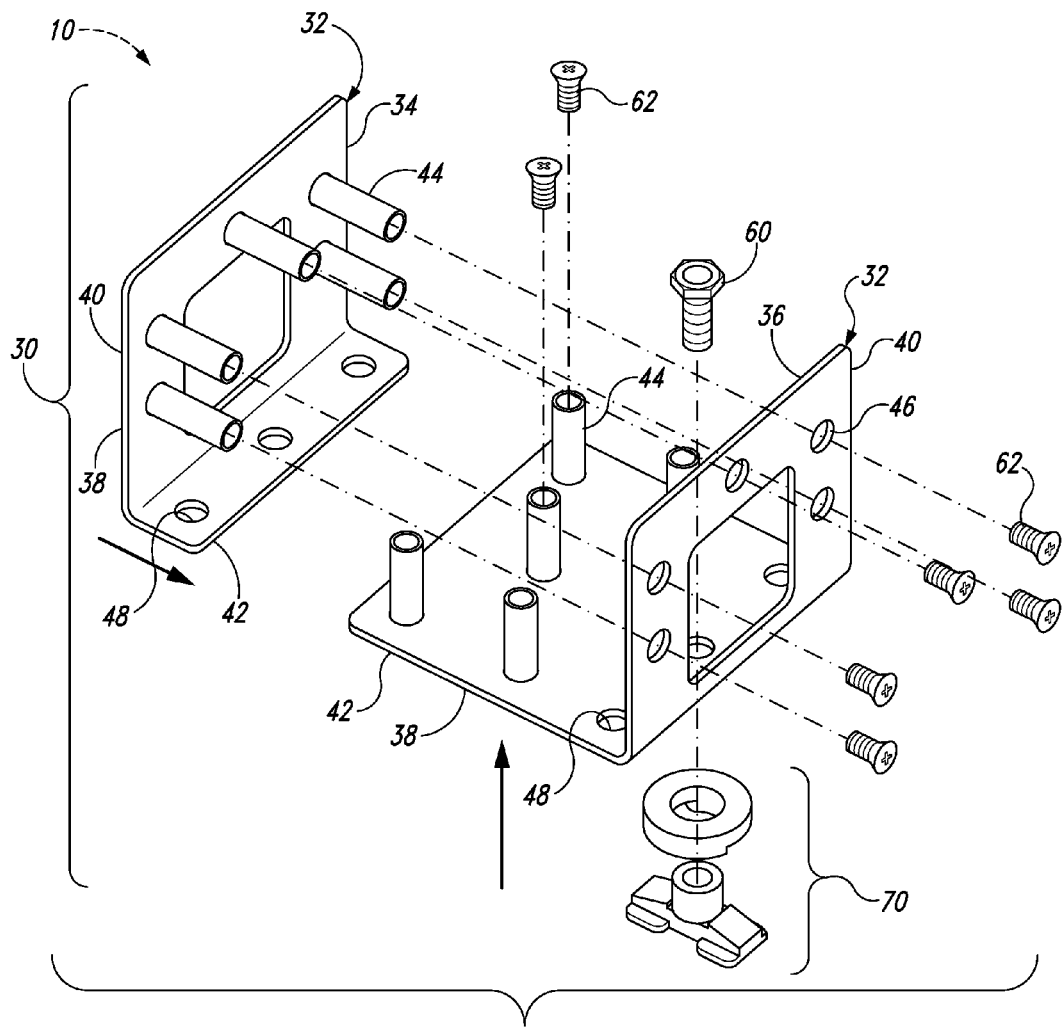
FIG. 4 is an exploded view of the saddle bracket assemblies of FIG. 3.

As shown in FIGS. 3-4, some embodiments of saddle brackets 30 may be configured to couple multiple panels 20 together. In the illustrative, non-exclusive example of FIGS. 3-4, the saddle bracket 30 is configured to couple two panels 20 substantially perpendicularly. However, the angle between two panels coupled with saddle brackets 30 may be any angle and the angle between two coupled panels may be acute, right, obtuse, or substantially 180°. Hence, saddle brackets 30 may be configured to couple two panels 20 at any defined angle therebetween. In the example of FIGS. 3-4, the auxiliary arm 42 of the female bracket member 36 is configured generally like a principal arm 40 of a male bracket member 34. The female bracket member 36 includes one or more standoffs 44 affixed to the auxiliary arm 42, spaced away from the optional bracket-coupling holes 48 of the auxiliary arm 42. The standoff(s) 44 of the female bracket member 36 is configured to mate with one or more panel passages 28 of a second panel 20 (the first panel 20 being the panel 20 coupled to the male bracket member 34 in FIG. 3). The standoff(s) 44 of the female bracket member 36 may project from the auxiliary arm 42 of the female bracket member 36 and may project substantially perpendicular to the auxiliary arm 42 of the female bracket member 36 and/or substantially parallel to the principal arm 40 of the female bracket member 36. Projecting standoffs 44 of the female bracket member 36 may project from the same side of the auxiliary arm 42 of the female bracket member 36 as the principal arm 40 of the female bracket member 36, as shown in the example of FIGS. 3-4.

The bracket members 32 shown in solid lines in FIG. 3 may be sufficient to connect the two panels 20 together or the connection between the two panels 20 may be completed with additional structures, as shown in dotted lines in FIG. 3. For example, a third bracket member 32 such as a second female bracket member 36 may be coupled at the facing 22 of the second panel 20 opposite the auxiliary arm 42 of the female bracket member 36 in solid lines. Additionally or alternatively, the dotted line structure may be an angle bracket secured to both the facing 22 of the second panel 20 opposite the auxiliary arm 42 of the female bracket member 36 and the principal arm 40 of the male bracket member 34. Additionally or alternatively, the dotted line structure may be a plate and/or one or more washers to bear the load of one or more panel connectors 62 coupled to the standoff(s) 44 of the female bracket member 36. The dotted line structure, or a portion thereof, may be bonded to or be a portion of the male bracket member 34.

Figure 5:
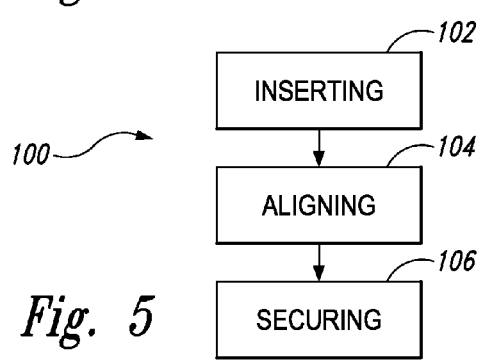
FIG. 5 is a schematic representation of methods of installing a saddle bracket assembly.

FIG. 5 schematically represents methods 100 of creating saddle bracket-panel assemblies. Methods 100 comprise inserting 102 one or more standoffs of a male bracket member into one or more panel passages, aligning 104 one or more panel-coupling holes of a female bracket member over the standoff(s) in the panel passage(s), and securing 106 the male bracket member and the female bracket member together and to the panel by coupling a panel connector to each standoff, resulting in each panel connector coupling each standoff to the second bracket member and entrapping the panel between the first bracket member and the second bracket member.

Generally, inserting 102, aligning 104, and securing 106 may be methods of creating and/or forming saddle bracket-panel assemblies 10, saddle brackets 30, and components thereof. However, methods may be performed with panels, saddle brackets, and components thereof that include only a subset of the features of panels 20, saddle brackets 30, and components thereof. For simplicity and clarity, methods 100 generally are described with reference to numbered elements from the figures even though methods 100 may be performed with elements that do not include all of the features of the corresponding numbered elements or the specific embodiments illustrated.

FIGS. 6-9 collectively illustrate methods 100 by showing illustrative, non-exclusive examples of a saddle bracket 30 and a panel 20 in various states of partial assembly.

Figure 6:
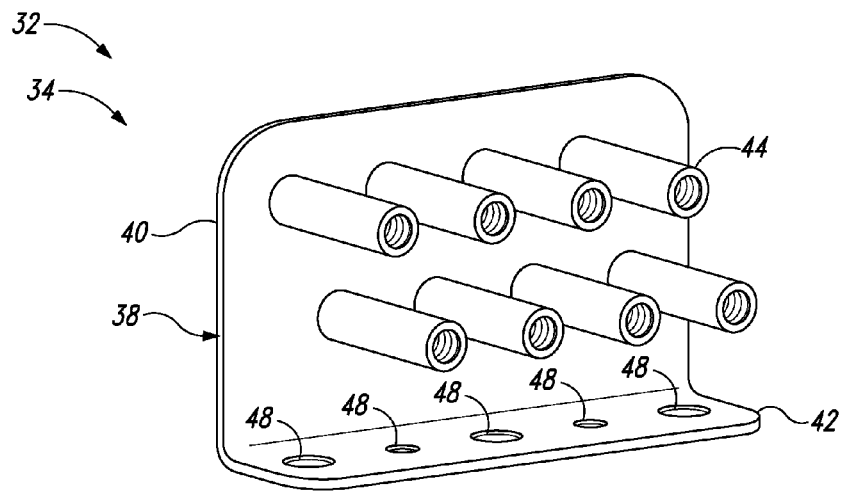
FIG. 6 is a drawing of an illustrative, non-exclusive example of a male bracket member of a saddle bracket.

Methods 100 may comprise selecting a male bracket member 34, e.g., selecting a male bracket member 34 that includes one or more standoffs 44 such as the male bracket member 34 of FIG. 6. Additionally or alternatively, methods 100 may include receiving a male bracket member 34, e.g., from a supplier. In FIG. 6, the male bracket member 34 includes a body 38 that is formed in an L-shaped profile and is formed of a unitary piece of thin material. The male bracket member 34 of FIG. 6 includes eight standoffs 44 affixed to the principal arm 40 and arranged in two rows of four.

Methods 100 may comprise affixing one or more standoffs 44 to the principal arm 40 of the male bracket member 34 and may include affixing the standoffs 44 within one or more standoff holes 50 defined in the principal arm 40. The affixing may be by crimping, press fitting, snap fitting, fastening, bonding, brazing, welding, molding, consolidating, etc. Further, methods 100 may comprise forming one or more standoff holes 50 in the principal arm 40 prior to affixing a standoff 44. Additionally or alternatively, methods 100 may comprise forming the one or more standoffs 44 and the principal arm 40, e.g., by molding, machining, casting, and/or additive manufacturing.

Also in FIG. 6, the auxiliary arm 42 of the male bracket member 34 defines a series of five bracket-coupling holes 48 arranged in a row. The bracket-coupling holes 48 are generally circular. Three of the bracket-coupling holes 48 have a relatively larger diameter while two of the bracket-coupling holes 48 have a relatively smaller diameter. Methods 100 may comprise forming at least one bracket-coupling hole 48 in the auxiliary arm 42.

Figure 7:
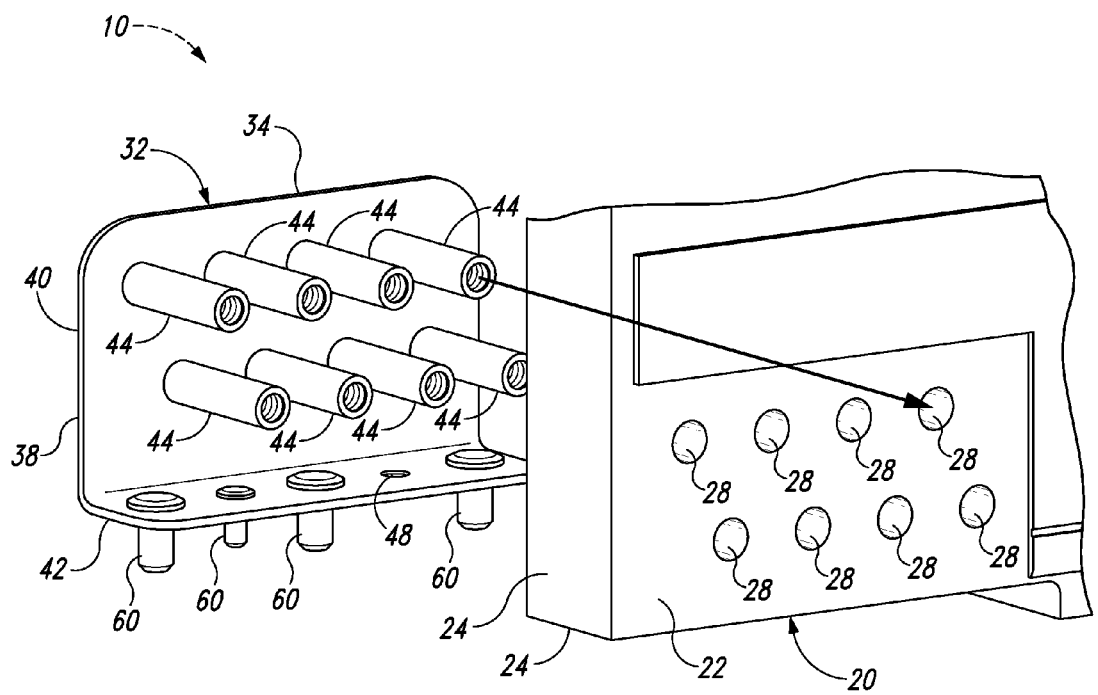
FIG. 7 is a representation of the coupling of the male bracket member of FIG. 6 to an illustrative, non-exclusive example of a panel.

Turning to FIG. 7, inserting 102 is schematically represented by the bold arrow. In FIG. 7, the male bracket member 34 includes several bracket connectors 60. Inserting 102 may be inserting the standoff(s) 44 into the panel passage(s) 28 from one of the facings 22 of the panel 20 and may include contacting that facing 22 with the principal arm 40 of the male bracket member 34 when the standoff(s) 44 are inserted into the panel passage(s) 28.

Methods 100 may further comprise inserting one or more bracket connectors 60 into suitably-sized bracket-coupling holes 48 of the male bracket member 34. Methods 100 may comprise affixing one or more bracket connectors 60 to the auxiliary arm 42, optionally in the optional bracket-coupling holes 48. Affixing a bracket connector 60 to the auxiliary arm 42 may be by crimping, press fitting, snap fitting, fastening, bonding, brazing, welding, molding, consolidating, etc. Additionally or alternatively, methods 100 may comprise forming the one or more bracket connectors 60 and the auxiliary arm 42, e.g., by molding, machining, casting, and/or additive manufacturing. Alternatively, methods 100 may not include use of any bracket connector 60. When methods 100 include inserting and/or affixing a bracket connector 60, the inserting and/or affixing is performed generally before inserting 102 the standoffs 44 of the male bracket member 34 into the panel passages 28 of the panel 20.

Though four of the five bracket coupling holes are shown with a bracket connector 60 in FIG. 7, the same-sized bracket-coupling holes 48 may serve as alternate positions for bracket connectors 60. Hence, inserting a bracket connector 60 may include inserting a bracket connector 60 into each of the bracket-coupling holes 48 or a subset of the bracket-coupling holes 48. The subset of bracket coupling holes 48 into which bracket connectors 60 are inserted may be selected according to where the saddle bracket 30 will fit on the panel 20 and/or where one desires to install a structural connector 70.

Panels 20 may be prepared for inserting 102 by forming one or more panel passages 28 in a panel to form panel 20. Forming panel passages may include boring, drilling, punching, etc., and may include inserting a ferrule, a bushing, filler, and/or adhesive into the panel to form the panel passage(s) 28. Additionally or alternatively, panels 20 with existing panel passages 28 may be selected and/or received (e.g., from a supplier).

Figure 8:
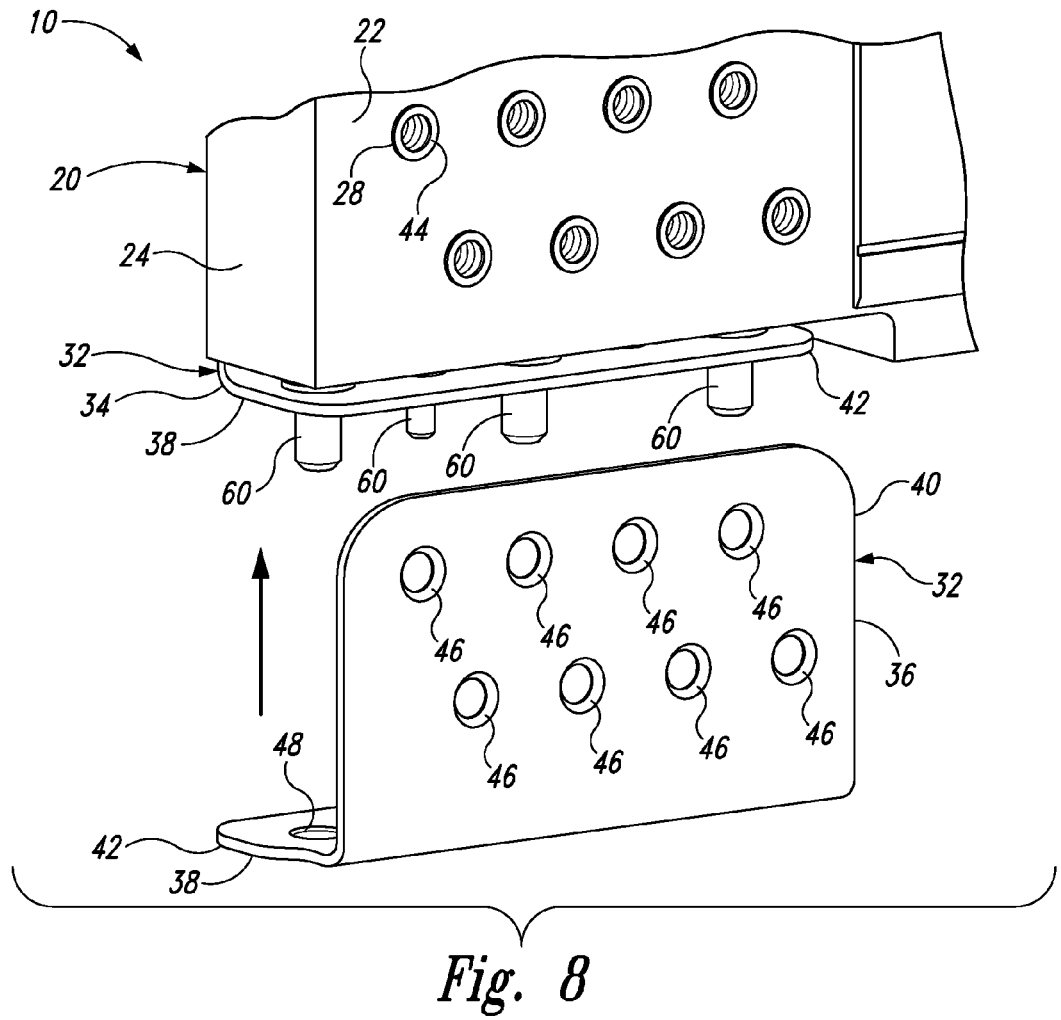
FIG. 8 is a representation of the coupling of an illustrative, non-exclusive example of a female bracket member to the assembly of FIG. 7.

Turning to FIG. 8, aligning 104 is schematically represented by the bold arrow. Aligning 104 may include aligning the one or more panel-coupling holes 46 of a female bracket member 36 with corresponding panel passages 28 of the panel 20. Aligning 104 may include contacting the facing 22 of the panel 20 that is opposite the principal arm 40 of the male bracket member 34 with the principal arm 40 of the female bracket member 36.

Though FIG. 8 indicates aligning 104 after inserting 102 the standoffs of the male bracket member 34 into the panel passages 28, aligning 104 may be performed before inserting 102, after inserting 102, and/or at least partially concurrently with inserting 102. When aligning 104 is performed at least partially before inserting 102, bracket connectors 60 may be inserted into the bracket-coupling holes 48 of the male bracket member 34 after the aligning 104 (thus, generally avoiding interference between the bracket connectors 60 and the female bracket member 36 while inserting 102 the standoffs 44 of the male bracket member 34 into the panel passages 28).

Aligning 104 a panel-coupling hole 46 with a standoff 44 may include aligning a bracket-coupling hole 48 of the female bracket member 36 with a bracket-coupling hole 48 of the male bracket member 34, and/or with a bracket connector 60 coupled to the male bracket member 34. Additionally or alternatively, aligning 104 may comprise inserting a bracket connector 60 through a bracket-coupling hole 48 of the female bracket member 36. The bracket connector 60 may be coupled to the male bracket member 34 before, during, and/or after inserting through the bracket-coupling hole 48 of the female bracket member 36. Further, the bracket connector 60 may be coupled to a structural connector 70 and/or a securing mechanism. For example, a bracket connector 60 which is a threaded bolt may be inserted through the bracket-coupling hole 48 of the male bracket member 34 and the bracket-coupling hole 48 of the female bracket member 36 and then secured to both the male bracket member 34 and the female bracket member 36 with a securing mechanism which is a nut.

Methods 100 may comprise selecting a female bracket member 36 such as the female bracket member 36 of FIG. 8. In FIG. 8, the female bracket member 36 includes a body 38 that is formed in an L-shaped profile and formed of a unitary piece of thin material. The principal arm 40 of the female bracket member 36 defines eight panel-coupling holes 46, arranged to correspond to the eight standoffs 44 of the male bracket member 34 and the eight panel passages 28. The auxiliary arm 42 of the female bracket member 36 defines five bracket-coupling holes 48 that correspond in size and arrangement to the five bracket-coupling holes 48 of the male bracket member 34.

Figure 9:
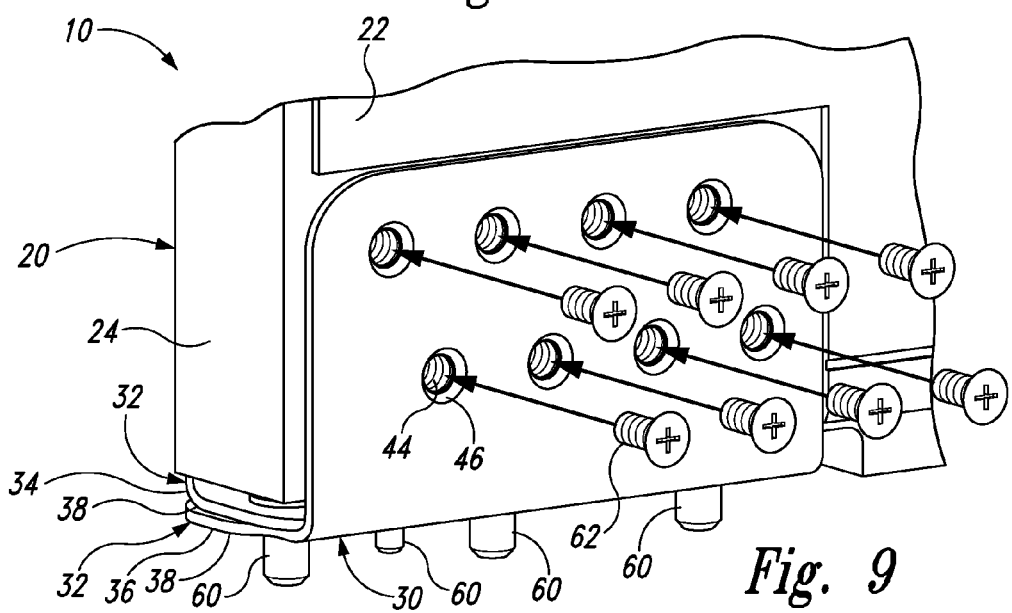
FIG. 9 is a representation of the securing of the assembly of FIG. 8.

Turning to FIG. 9, securing 106 is schematically represented by the bold arrows between the panel connectors 62 and the standoffs 44 within the panel passages 28. Securing 106 may include coupling, e.g., removably coupling, a panel connector 62 to a standoff 44 when the standoff 44 is within a panel passage 28 and when a panel-coupling hole 46 of the female bracket member 36 is aligned with the standoff 44 and the panel passage 28. When the standoff 44 of the male bracket member 34 is coupled to the principal arm 40 of the female bracket member 36 (through the panel-coupling hole 46), the panel 20 is entrapped and/or secured between the male bracket member 34 and the female bracket member 36.

Further, methods 100 may include assembling more than one panel 20 with one or more saddle brackets 30 to form an extended structure, for example using components shown in the illustrative, non-exclusive example of FIGS. 3-4. Such methods 100 may comprise inserting 102 a standoff 44 of a male bracket member 34 into a panel passage 28 of a first panel 20. Methods 100 may then comprise aligning a panel-coupling hole 46 of a female bracket member 36 with the standoff 44. The female bracket member 36 may include and/or be selected to include one or more standoffs 44 affixed to the auxiliary arm 42. Methods 100 also may include inserting a standoff 44 of the female bracket member 36 into a panel passage 28 of a second panel 20. The first panel 20 may be secured between the male bracket member 34 and the female bracket member 36 with panel connectors 62 (e.g., by securing 106). The second panel 20 may be secured with another female bracket member 36, a flat plate, and/or an angle bracket as shown in dashed lines in FIG. 3.

Illustrative, non-exclusive examples of inventive subject matter according to the present disclosure are described in the following enumerated paragraphs.

A1. A saddle bracket comprising:
a first bracket member that includes a body and one or more standoffs, wherein the body of the first bracket member includes a principal arm and an auxiliary arm, wherein the one or more standoffs are affixed to the principal arm of the first bracket member, and wherein the auxiliary arm of the first bracket member defines at least one bracket-coupling hole;
a second bracket member that includes a body that includes a principal arm and an auxiliary arm, wherein the principal arm of the second bracket member defines one or more panel-coupling holes configured to align with the one or more standoffs of the first bracket member, and wherein the auxiliary arm of the second bracket member defines at least one bracket-coupling hole, each bracket-coupling hole of the second bracket member configured to align with at least one bracket-coupling hole of the first bracket member when the panel-coupling holes are aligned with the standoffs;
wherein the first bracket member and the second bracket member are configured to mate to a panel that includes two substantially parallel facings and an edge surface within an edge region, wherein the first bracket member and the second bracket member are configured, when mated to the panel, to partially cover the two substantially parallel facings and the edge surface.

A2. The saddle bracket of paragraph A1, wherein the first bracket member includes a plurality of and/or at least two standoffs.

A3. The saddle bracket of any of paragraphs A1-A2, wherein the principal arm of the second bracket member defines a plurality of and/or at least two panel-coupling holes.

A4. The saddle bracket of any of paragraphs A1-A3, wherein the saddle bracket is configured to mate to the panel by inserting the one or more standoffs into at least one panel passage defined by the panel.

A5. The saddle bracket of any of paragraphs A1-A4, wherein the saddle bracket is configured to mate to the panel by inserting each of the standoffs into a different panel passage defined by the panel.

A6. The saddle bracket of any of paragraphs A1-A5, wherein each standoff is configured to align with a different panel-coupling hole.

A7. The saddle bracket of any of paragraphs A1-A6, wherein at least one of the panel-coupling holes is configured to align with at least two standoffs.

A8. The saddle bracket of any of paragraphs A1-A7, wherein the saddle bracket is configured to secure a/the panel mated to the saddle bracket by coupling the one or more standoffs through the panel and to the principal arm of the second bracket member with panel connectors, optionally wherein the panel connectors are threaded.

A9. The saddle bracket of any of paragraphs A1-A8, wherein at least one, optionally all, of the standoffs is configured to accept and/or to receive at least one of a bolt, a screw, a stud, a snap, a press pin, a push pin, and a wire.

A9.1. The saddle bracket of paragraph A9, wherein at least one, optionally all, of the standoffs is threaded, optionally at least one of internally threaded and externally threaded.

A10. The saddle bracket of any of paragraphs A1-A9, wherein the body of the first bracket member and the body of the second bracket member, when connected together through at least one of the bracket-coupling holes of the first bracket member and at least one of the bracket-coupling holes of the second bracket member, form a U-shaped profile with the principal arm of the first bracket member spaced apart from the principal arm of the second bracket member and the auxiliary arm of the first bracket member overlapping the auxiliary arm of the second bracket member.

A10.1. The saddle bracket of paragraph A10, wherein at least one, optionally all, of the standoffs span at least a portion of a gap between the principal arm of the first bracket member and the principal arm of the second bracket member.

A10.2. The saddle bracket of any of paragraphs A10-A10.1, wherein at least one, optionally all, of the standoffs substantially span a gap between the principal arm of the first bracket member and the principal arm of the second bracket member.

A10.3. The saddle bracket of any of paragraphs A10-A10.2, wherein at least one, optionally all, of the standoffs project through the corresponding panel-coupling holes.

A10.4. The saddle bracket of any of paragraphs A10-A10.3, wherein a gap between the principal arm of the first bracket member and the principal arm of the second bracket member is configured to correspond to a thickness of the panel between the two substantially parallel facings.

A11. The saddle bracket of any of paragraphs A1-A10.4, wherein the body of the first bracket member has an L-shaped profile.

A12. The saddle bracket of any of paragraphs A1-A11, wherein the auxiliary arm of the first bracket member projects substantially perpendicularly from the principal arm of the first bracket member.

A13. The saddle bracket of any of paragraphs A1-A12, wherein the standoffs of the first bracket member project substantially perpendicular to the principal arm of the first bracket member.

A14. The saddle bracket of any of paragraphs A1-A13, wherein the standoffs of the first bracket member project substantially parallel to the auxiliary arm of the first bracket member.

A15. The saddle bracket of any of paragraphs A1-A14, wherein the standoffs of the first bracket member and the auxiliary arm of the first bracket member project from the same side of the principal arm of the first bracket member.

A16. The saddle bracket of any of paragraphs A1-A15, wherein the second bracket member has an L-shaped profile.

A17. The saddle bracket of any of paragraphs A1-A16, wherein the body of the second bracket member has an L-shaped profile.

A18. The saddle bracket of any of paragraphs A1-A17, wherein the auxiliary arm of the second bracket member projects substantially perpendicularly from the principal arm of the second bracket member.

A19. The saddle bracket of any of paragraphs A1-A18, further comprising a bracket connector, wherein the first bracket member and the second bracket member are coupled together with the bracket connector through at least one of the bracket-coupling holes of the first bracket member and at least one of the bracket-coupling holes of the second bracket member.

A19.1. The saddle bracket of paragraph A19, wherein the standoffs are aligned with the panel-coupling holes.

A19.2. The saddle bracket of any of paragraphs A19-A19.1, wherein the bracket connector includes a structural connector or is coupled to a structural connector, optionally wherein the structural connector includes at least one of a screw, a nut, a pin, a bolt, a threaded rod, an internally threaded barrel, a clip, a hook, a clamp, a snap, a stud, a wire, and a clevis.

A20. The saddle bracket of any of paragraphs A1-A19.2, wherein the auxiliary arm of the first bracket member defines at least two bracket-coupling holes and the auxiliary arm of the second bracket member defines at least two bracket-coupling holes.

A20.1. The saddle bracket of paragraph A20, wherein each bracket-coupling hole of the first bracket member is configured to align with at least one of the bracket-coupling holes of the second bracket member when the panel-coupling holes are aligned with the standoffs.

A20.2. The saddle bracket of any of paragraphs A20-A20.1, wherein each bracket-coupling hole of the first bracket member is configured to align with a different bracket-coupling hole of the second bracket member when the panel-coupling holes are aligned with the standoffs.

A21. The saddle bracket of any of paragraphs A1-A20.2, wherein the first bracket member includes a bracket connector affixed to one of the bracket-coupling holes of the first bracket member, optionally wherein the bracket connector affixed to one of the bracket-coupling holes of the first bracket member projects away from the principal arm of the first bracket member.

A22. The saddle bracket of any of paragraphs A1-A21, further comprising a secondary panel, wherein the second bracket member includes one or more standoffs affixed to the auxiliary arm of the second bracket member, optionally wherein the standoffs of the second bracket member are configured to mate with the secondary panel.

A22.1. The saddle bracket of paragraph A22, wherein at least one, optionally all, of the standoffs is configured to receive at least one of a bolt, a screw, a stud, a snap, a press pin, a push pin, and a wire.

A22.2. The saddle bracket of any of paragraphs A22-A22.1, wherein at least one, optionally all, of the standoffs is threaded, optionally at least one of internally threaded and externally threaded.

A22.3. The saddle bracket of any of paragraphs A22-A22.2, wherein the standoffs of the second bracket member project substantially perpendicular to the auxiliary arm of the second bracket member.

A22.4. The saddle bracket of any of paragraphs A22-A22.3, wherein the standoffs of the second bracket member project substantially parallel to the principal arm of the second bracket member.

A22.5. The saddle bracket of any of paragraphs A22-A22.4, wherein the standoffs of the second bracket member and the principal arm of the second bracket member project from the same side of the auxiliary arm of the second bracket member.

A23. A kit including the first bracket member and the second bracket member of any of paragraphs A1-A22.5.

A23.1. The kit of paragraph A23, wherein the kit is a kit to form a saddle bracket, optionally the saddle bracket of any of paragraphs A1-A22.5.

A23.2. The kit of any of paragraphs A23-A23.1, wherein the kit is configured to couple a panel to a structure.

A23.3. The kit of any of paragraphs A23-A23.2, further comprising at least one of a panel connector and a structural connector.

B1. An assembly comprising:
 a panel with two substantially parallel facings and an edge surface within an edge region, wherein the panel defines one or more panel passages that each span between the two substantially parallel facings; and
 the saddle bracket of any of paragraphs A1-A22.5, or a saddle bracket formed from the kit of any of paragraphs A23-A23.3, mated to the panel, covering, in the edge region, the two substantially parallel facings and the edge surface.

B2. The assembly of paragraph B1, wherein the panel defines a plurality of and/or at least two panel passages.

B3. The assembly of any of paragraphs B1-B2, wherein at least one, optionally all, of the standoffs of the first bracket member are within at least one of the panel passages.

B4. The assembly of any of paragraphs B1-B3, wherein each standoff of the first bracket member is within a different panel passage.

B5. The assembly of any of paragraphs B1-B4, further comprising one or more panel connectors, each coupled, optionally removably coupled, to one of the standoffs of the first bracket member through the panel and to the principal arm of the second bracket member.

B6. The assembly of any of paragraphs B1-B5, wherein the panel is a sandwich panel, optionally at least one of a honeycomb-core panel, a foam-core panel, a hollow-core panel, and a corrugated-core panel.

B7. The assembly of any of paragraphs B1-B6, wherein the panel includes a core that defines at least one hollow space, optionally wherein the core is at least one of a honeycomb core, a foam core, a hollow core, and a corrugated core.

B8. The assembly of any of paragraphs B1-B7, wherein the one or more standoffs of the first bracket member substantially span a thickness of the panel.

B9. The assembly of any of paragraphs B1-B8, wherein a length of one of the standoffs, optionally of each of the standoffs, of the first bracket member is less than or greater than a thickness of the panel.

B10. The assembly of any of paragraphs B1-B9, wherein the saddle bracket includes:
 a first bracket member that includes a body and one or more standoffs, wherein the body of the first bracket member includes a principal arm and an auxiliary arm, wherein the one or more standoffs are affixed to the principal arm of the first bracket member, and wherein the auxiliary arm of the first bracket member defines at least one bracket-coupling hole; and
 a second bracket member that includes a body that includes a principal arm and an auxiliary arm, wherein the principal arm of the second bracket member defines one or more panel-coupling holes aligned with the one or more standoffs of the first bracket member, and wherein the auxiliary arm of the second bracket member defines at least one bracket-coupling hole, each bracket-coupling hole of the second bracket member aligned with at least one bracket-coupling hole of the first bracket member.

B11. The assembly of any of paragraphs B1-B10, wherein the assembly is at least a portion of at least one of a wall, a partition, a divider, a bulkhead, a door, a shelf, a closet, a compartment, a bin, a ceiling, and a floor.

B12. The assembly of any of paragraphs B1-B11, wherein the assembly is incorporated into at least one of a vehicle, an aircraft, a watercraft, a land vehicle, and a building.

B13. An aircraft that includes the assembly of any of paragraphs B1-B11.

C1. A method comprising:
 inserting one or more standoffs of a first bracket member into one or more panel passages that span a panel from a first facing to a second facing, wherein the inserting is inserting from the first facing;
 aligning one or more panel-coupling holes of a second bracket member on the second facing with the one or more standoffs of the first bracket member; and
 securing the first bracket member and the second bracket member together and to the panel by coupling, optionally removably coupling, a panel connector to each standoff, resulting in each panel connector coupling each standoff to the second bracket member and entrapping the panel between the first bracket member and the second bracket member.

C2. The method of paragraph C1, wherein the first bracket member is the first bracket member of any of paragraphs A1-A23.3.

C3. The method of any of paragraphs C1-C2, wherein the second bracket member is the second bracket member of any of paragraphs A1-A23.3.

C4. The method of any of paragraphs C1-C3, further comprising forming the one or more panel passages in the panel.

C5. The method of any of paragraphs C1-C4, further comprising affixing the standoffs to the first bracket member.

C6. The method of any of paragraphs C1-05, wherein the first bracket member includes a principal arm to which the one or more standoffs are affixed and an auxiliary arm that defines at least one bracket-coupling hole, the method further comprising inserting a bracket connector through the bracket-coupling hole of the first bracket member.

C6.1. The method of paragraph C6, wherein the second bracket member includes a principal arm that defines the one or more panel-coupling holes and an auxiliary arm that defines at least one bracket-coupling hole, the method further comprising inserting the bracket connector through the bracket-coupling hole of the second bracket member before and/or during the aligning.

C6.2. The method of any of paragraphs C6-C6.1, further comprising coupling a structural connector to the bracket connector.

C7. The method of any of paragraphs C1-C6.2, wherein the second bracket member includes a principal arm that defines the one or more panel-coupling holes, an auxiliary arm that defines at least one bracket-coupling hole, and at least one standoff affixed to the auxiliary arm of the second bracket, the method further comprising, after the inserting the one or more standoffs of the first bracket member, inserting the at least one standoff of the second bracket member into a panel passage that spans a second panel from a first facing of the second panel to a second facing of the second panel, wherein the inserting the at least one standoff of the second bracket member is inserting from the first facing of the second panel.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function. Further, as used herein, the singular forms "a", "an" and "the" may be intended to include the plural forms as well, unless the context clearly indicates otherwise.

The various disclosed elements of apparatuses and steps of methods disclosed herein are not required of all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An assembly comprising:
a sandwich panel with two substantially parallel facings and an edge surface within an edge region, wherein the sandwich panel defines one or more panel passages that each span between the two substantially parallel facings, wherein the sandwich panel has a panel thickness between the two substantially parallel facings; and
a saddle bracket mated to the sandwich panel, covering, in the edge region, the two substantially parallel facings and the edge surface;
wherein the saddle bracket includes
a first bracket member that includes a body and one or more standoffs in the one or more panel passages, wherein the one or more standoffs span the panel thickness, wherein the body of the first bracket member includes a principal arm and an auxiliary arm, wherein the one or more standoffs are unitary with the principal arm of the first bracket member, and wherein the auxiliary arm of the first bracket member defines at least one bracket-coupling hole; and
a second bracket member that includes a body that includes a principal arm and an auxiliary arm, wherein the principal arm of the second bracket member defines one or more panel-coupling holes aligned with the one or more standoffs of the first bracket member, and wherein the auxiliary arm of the second bracket member defines at least one bracket-coupling hole, each bracket-coupling hole of the second bracket member aligned with at least one bracket-coupling hole of the first bracket member.

2. The assembly of claim 1, wherein the first bracket member includes a plurality of standoffs.

3. The assembly of claim 1, wherein the principal arm of the second bracket member defines a plurality of panel-coupling holes.

4. The assembly of claim 1, wherein the sandwich panel defines a plurality of panel passages.

5. The assembly of claim 1, wherein each standoff is configured to align with a different panel-coupling hole.

6. The assembly of claim 1, wherein all of the standoffs are configured to receive at least one of a bolt, a screw, a stud, a snap, a press pin, a push pin, and a wire.

7. The assembly of claim 1, further comprising a bracket connector, wherein the first bracket member and the second bracket member are coupled together with the bracket connector through at least one of the bracket-coupling holes of the first bracket member and at least one of the bracket-coupling holes of the second bracket member.

8. The assembly of claim 1, further comprising a secondary sandwich panel, wherein the second bracket member includes one or more standoffs affixed to the auxiliary arm of the second bracket member, wherein the standoffs of the second bracket member are configured to mate with the secondary sandwich panel.

9. The assembly of claim 8, wherein the standoffs of the second bracket member project substantially perpendicular to the auxiliary arm of the second bracket member and wherein the standoffs of the second bracket member and the principal arm of the second bracket member project from the same side of the auxiliary arm of the second bracket member.

10. An aircraft that includes the assembly of claim 1.

11. A method of assembling a saddle bracket on a sandwich panel, forming a saddle bracket coupled to the sandwich panel, the method comprising:
selecting a saddle bracket including a first bracket member and a second bracket member, wherein the first bracket member includes a body and one or more standoffs, wherein the body of the first bracket member includes a principal arm and an auxiliary arm, wherein the one or more standoffs are unitary with the principal arm of the first bracket member, wherein the auxiliary arm of the first bracket member defines at least one bracket-coupling hole, wherein the second bracket member includes a body that includes a principal arm and an auxiliary arm, wherein the principal arm of the second bracket member defines one or more panel-coupling holes configured to align with the one or more standoffs of the first bracket member, and wherein the auxiliary arm of the second bracket member defines at least one bracket-coupling hole, each bracket-coupling hole of the second bracket member configured to align with at least one bracket-coupling hole of the first bracket member when the panel-coupling holes are aligned with the standoffs;
inserting the standoffs of the first bracket member into one or more panel passages that span a thickness of a sandwich panel from a first facing of the sandwich panel to a second facing of the sandwich panel, wherein the standoffs span the thickness of the sandwich panel, wherein the inserting is inserting from the first facing, and wherein the inserting includes covering, in an edge region of the sandwich panel, the first facing and an edge surface of the sandwich panel with the first bracket member;
aligning the panel-coupling holes of the second bracket member on the second facing with the standoffs of the first bracket member; and securing the first bracket member and the second bracket member together and to the sandwich panel by removably coupling a panel connector to each standoff, resulting in each panel connector coupling each standoff to the second bracket member and entrapping the sandwich panel between the first bracket member and the second bracket member.

12. The method of claim 11, further comprising forming the one or more panel passages in the sandwich panel.

\* \* \* \* \*